United States Patent
Iwabuchi

(10) Patent No.: US 9,111,304 B2
(45) Date of Patent: Aug. 18, 2015

(54) INFORMATION PROVISION DEVICE, INFORMATION PROVISION METHOD, INFORMATION PROVISION PROGRAM, AND COMPUTER-READABLE STORAGE MEDIUM FOR STORING SAID PROGRAM

(75) Inventor: Shigaku Iwabuchi, Tokyo (JP)

(73) Assignee: Rakuten, Inc., Tokyo (JP)

( * ) Notice: Subject to any disclaimer, the term of this patent is extended or adjusted under 35 U.S.C. 154(b) by 505 days.

(21) Appl. No.: 13/503,247

(22) PCT Filed: Oct. 22, 2010

(86) PCT No.: PCT/JP2010/068741
§ 371 (c)(1),
(2), (4) Date: Jun. 25, 2012

(87) PCT Pub. No.: WO2011/049209
PCT Pub. Date: Apr. 28, 2011

(65) Prior Publication Data
US 2012/0259741 A1   Oct. 11, 2012

(30) Foreign Application Priority Data

Oct. 23, 2009   (JP) .............................. P2009-244679

(51) Int. Cl.
*G06Q 30/06* (2012.01)
*G06Q 30/02* (2012.01)

(52) U.S. Cl.
CPC ............ *G06Q 30/06* (2013.01); *G06Q 30/0255* (2013.01)

(58) Field of Classification Search
CPC ..................................................... G06Q 30/06
USPC ........................................................ 705/26.1
See application file for complete search history.

(56) References Cited

U.S. PATENT DOCUMENTS

| 5,946,665 A | 8/1999 | Suzuki et al. |
| 7,202,773 B1 | 4/2007 | Oba et al. |

(Continued)

FOREIGN PATENT DOCUMENTS

| JP | 09-231274 A | 9/1997 |
| JP | 2001-195368 A | 7/2001 |

(Continued)

OTHER PUBLICATIONS

Satoshi Tomokiyo, "Aki no Yonaga o Kaitekini Sugosu Online Shoten Katsuyo Technique", YOMIURI PC, Dec. 1, 2003, pp. 40-49, vol. 8, No. 12.

Tetsuo Takase, "Monthly "Mobile Mail Order" research project for utilizing the main tool for 1 to 1 market at maximum, would "click" by mobile camera be the main stream of mobile mail order search!?", Net hanbai, Japan Kobun Printing Co., Ltd., vol. 8, No. 2, Jan. 25, 2007, p. 38.

(Continued)

*Primary Examiner* — Mila Airapetian
(74) *Attorney, Agent, or Firm* — Sughrue Mion, PLLC

(57) ABSTRACT

To determine candidates for product purchase in electronic commerce more easily when a user purchases an attracting product through electronic commerce, the server (14A) includes a retrieval API (164A). The retrieval API (164A) receives and analyzes identifying information from a user terminal (12A) having a function of acquiring identifying information for identifying a product and thereby identifies one or more products from the identifying information. Then, the retrieval API (164A) reads one or more product sales information corresponding to the identified one or more products from a product database (168) that stores product sales information related to sales of products. The retrieval API (164A) then stores the read one or more product sales information as a retrieval history into a retrieval history database (170) and transmits the one or more product sales information to the user terminal (12A) to be displayed as candidate product information on the user terminal (12A).

6 Claims, 14 Drawing Sheets

(56) References Cited

U.S. PATENT DOCUMENTS

| | | |
|---|---|---|
| 2001/0028603 A1 | 10/2001 | Shimazu |
| 2006/0169772 A1* | 8/2006 | Page et al. ............... 235/383 |
| 2006/0266825 A1 | 11/2006 | Do et al. |
| 2008/0164312 A1 | 7/2008 | Do et al. |

FOREIGN PATENT DOCUMENTS

| | | | |
|---|---|---|---|
| JP | 2001-290836 A | 10/2001 | |
| JP | 2002-092413 A | 3/2002 | |
| JP | 2003-006079 A | 1/2003 | |
| JP | 2003-058726 A | 2/2003 | |
| JP | 2004-062523 A | 2/2004 | |
| JP | 2008-542861 A | 11/2008 | |
| JP | 2008-305037 A | 12/2008 | |
| WO | 2005/124614 A1 | 12/2005 | |

OTHER PUBLICATIONS

Japanese Office Action dated Apr. 22, 2014 issued in Japanese Patent Application No. P2011-537322.

Japanese Patent Office, Japanese Office Action issued in corresponding JP Application No. 2011-537322, dated Nov. 12, 2013.

"Monthly 'Shopping on Mobile': research project for maximizing the use of key one-to-one marketing tools(Gekkan 'mobairu tsuuhan': 1 to 1 maake no shuryoku tsuuru wo saidaigen ni katsuyou suru tame no kenkyuu kikaku)", 'Monthly Internet Sales'('Gekkan Netto Hanbai'), Japan, Koubunshuppan Corporation, vol. 11, No. 10, Sep. 25, 2010, p. 48-p. 49.

* cited by examiner

ID

INFORMATION PROVISION DEVICE, INFORMATION PROVISION METHOD, INFORMATION PROVISION PROGRAM, AND COMPUTER-READABLE STORAGE MEDIUM FOR STORING SAID PROGRAM

CROSS REFERENCE TO RELATED APPLICATION

This application is a National Stage of International Application No. PCT/JP2010/068741 filed Oct. 22, 2010, claiming priority based on Japanese Patent Application No. 2009-244679 filed Oct. 23, 2009, the contents of all of which are incorporated herein by reference in their entirety.

TECHNICAL FIELD

The present invention relates to an information provision device, an information provision method, an information provision program, and a computer-readable storage medium for storing said program and, particularly, to an information provision device, an information provision method, an information provision program, and a computer-readable storage medium for storing said program that allow easier determination of candidates for purchase of a product in electronic commerce.

BACKGROUND ART

Electronic commerce to purchase products or obtain services through the Internet has become widely adopted.

Some systems where a user selects a product and makes a purchase or application in a Web page using the Internet allow the selection, application and purchase procedure of a plurality of products to be done in one operation by providing a product name field indicating a plurality of product names or the like and check boxes for a user to indicate an intention of purchase for each of the products on a product list page, and putting an object linked to a shopping cart page in which a user confirms purchase information and makes an application onto the Web page (for example, see Patent Literature 1).

CITATION LIST

Patent Literature

PTL 1: JP 2002-92413 A

SUMMARY OF INVENTION

Technical Problem

However, in the case where a user of electronic commerce sees an actual product in a real store and desires to purchase the product through electronic commerce, burdensome work such as searching for the product across electronic commerce web pages, comparing prices, and adding candidates for purchase to a so-called shopping cart to store them is required.

The present invention has been accomplished in view of the foregoing, and aims to easily save and determine candidates for purchase of a product in electronic commerce when a user purchases a product that has attracted the user's attention through electronic commerce.

Solution to Problem

An information provision device according to the present invention includes a first receiving means for receiving identifying information from a user terminal having a function of acquiring identifying information for identifying a product, an identifying means for analyzing identifying information received by the first receiving means and identifying one or a plurality of products from the identifying information, a retrieval means for reading one or a plurality of product sales information corresponding to one or a plurality of products identified by the identifying means from a product database that stores product sales information, related to sales of products, and an output means for storing one or a plurality of product sales information read by the retrieval means as a retrieval history into a retrieval history database and transmitting the one or plurality of product sales information to the user terminal to be displayed as candidate product information on the user terminal.

An information provision method according to the present invention is an information provision method executed by an information provision device, including a first receiving step of receiving identifying information from a user terminal having a function of acquiring identifying information for identifying a product, an identifying step of analyzing identifying information received in the first receiving step and identifying one or a plurality of products from the identifying information, a retrieval step of reading one or a plurality of product sales information corresponding to one or a plurality of products identified in the identifying step from a product database that stores product sales information related to sales of products, and an output step of storing one or a plurality of product sales information read in the retrieval step as a retrieval history into a retrieval history database and transmitting the one or plurality of product sales information to the user terminal to be displayed as candidate product information on the user terminal.

An information provision program according to the present invention causes a computer to function as a first receiving means for receiving identifying information from a user terminal having a function of acquiring identifying information for identifying a product, an identifying means for analyzing identifying information received by the first receiving means and identifying one or a plurality of products from the identifying information, a retrieval means for reading one or a plurality of product sales information corresponding to one or a plurality of products identified by the identifying means from a product database that stores product sales information related to sales of products, and an output means for storing one or a plurality of product sales information read by the retrieval means as a retrieval history into a retrieval history database and transmitting the one or plurality of product sales information to the user terminal to be displayed as candidate product information on the user terminal.

A computer-readable storage medium according to the present invention stores an information provision program causing a computer to function as a first receiving means for receiving identifying information from a user terminal having a function of acquiring identifying information for identifying a product, an identifying means for analyzing identifying information received by the first receiving means and identifying one or a plurality of products from the identifying information, a retrieval means for reading one or a plurality of product sales information corresponding to one or a plurality of products identified by the identifying means from a product database that stores product sales information related to sales of products, and an output means for storing one or a plurality of product sales information read by the retrieval means as a retrieval history into a retrieval history database and transmitting the one or plurality of product sales information to the user terminal to be displayed as candidate product information on the user terminal.

According to the present invention described above, a product is identified from identifying information acquired in the user terminal, and product sales information corresponding to the product is extracted. The extracted product sales information is stored into a database as a retrieval history and displayed on the user terminal. In this manner, by storing retrieval results as a history in the database, not just displaying them on the terminal, it is possible to access the product sales information later. It is thereby possible to provide the product sales information to a user without need for the user to retransmit the identifying information, so that the user can easily save and determine candidates for purchase of a product.

The information provision device according to the present invention may further include a second receiving means for receiving product sales information extracted, in the user terminal having received and displayed one or a plurality of product sales information transmitted by the output means, from the one or plurality of product sales information according to specified extraction conditions from the user terminal, and a storage means for storing product sales information received by the second receiving means into a purchase candidate information database as purchase candidate information indicating candidates for purchase by a user or attractive information attracting a user's attention.

The information provision device according to the present invention may further include a second receiving means for receiving product sales information selected, in the user terminal having received and displayed one or a plurality of product sales information transmitted by the output means, from the one or plurality of product sales information from the user terminal, and a storage means for storing product sales information received by the second receiving means into a purchase candidate information database as purchase candidate information indicating candidates for purchase by a user or attractive information attracting a user's attention.

In this case, the product sales information retrieved in the information provision device and extracted under specified conditions in the user terminal or the product sales information retrieved in the information provision device and selected in the user terminal is stored into the purchase candidate information database as purchase candidate information or attractive information, separately from the retrieval history database. Thus, a user can easily save and determine candidates for purchase of a product.

In the information provision device according to the present invention, the identifying information may be a product code pre-assigned to each product and acquired by reading a barcode, the product sales information may be stored in association with the product code in the product database, and the identifying means may identify a product corresponding to the product code by reference to the product database.

In this case, a product is identified on the basis of the product code in a barcode acquired in the user terminal. Thus, a user can easily obtain the product sales information by simply reading the barcode and transmitting the product code to the information provision device.

In the information provision device according to the present invention, the identifying information may be image data of an actual product acquired by taking a picture or capturing a video, the product sales information may be stored in, association with a product image in the product database, and the identifying means may identify a product indicated by the image data by comparing the image data with each product image in the product database.

In this case, a product is identified on the basis of the image data acquired in the user terminal. Thus, a user can easily obtain the product sales information by simply taking a picture of a product or segmenting an image of a product from a video and transmitting the image data to the information provision device.

In the information provision device according to the present invention, the identifying information may be image data of text information related to a product acquired by taking a picture or capturing a video, the product sales information may be stored in association with specified attribute information for identifying a product in the product database, and the identifying means may identify a product indicated by the image data by comparing the text information obtained by analyzing the image data with each attribute information in the product database.

In this case, a product is identified on the basis of the image data acquired in the user terminal. Thus, a user can easily obtain the product sales information by simply taking a picture of text information related to a product or segmenting an image of the text information from a video and transmitting the image data to the information provision device.

In the information provision device according to the present invention, the retrieval means may display a screen allowing a user to select one or more products from one or a plurality of products identified by the identifying means on the user terminal, receive information indicating products selected by a user through the screen from the user terminal, and read product sales information corresponding to the received information from the product database.

In this case, the product sales information of the product identified in the information provision device and selected in the user terminal is retrieved. In this manlier, by allowing a user to select the search targets of the product sales information, it is possible to prevent information about the product which is unwanted by a user from being provided to the user.

In the information provision device according to the present invention, the first receiving means may further receive sort condition information indicating conditions for sorting the product sales information from the user terminal, the retrieval means may sort one or a plurality of product sales information read from the product database according to conditions indicated by the sort condition information, and the output means may transmit one or a plurality of product sales information read and sorted by the retrieval means to the user terminal.

In this case, because the product sales information is sorted according to the conditions designated on the user terminal side and provided to the terminal, the information is provided in a more convenient form.

Advantageous Effects of Invention

As described above, according to one aspect of the present invention, it is possible to easily save and determine candidates for purchase of a product in electronic commerce.

As described above, according to one aspect of the present invention, it is possible to easily save and determine candidates for purchase of a product in electronic commerce when a user purchases a product that has attracted the user's attention through electronic commerce.

DESCRIPTION OF EMBODIMENTS

Embodiments of the present invention are described hereinafter in detail with reference to the appended drawings. In the following embodiments, an information provision device according to the present invention is applied to a server. Note that, in the description of the drawings, the same or equivalent elements are denoted by the same reference symbols, and the redundant explanation thereof is omitted.

(First Embodiment)

Figure 1:
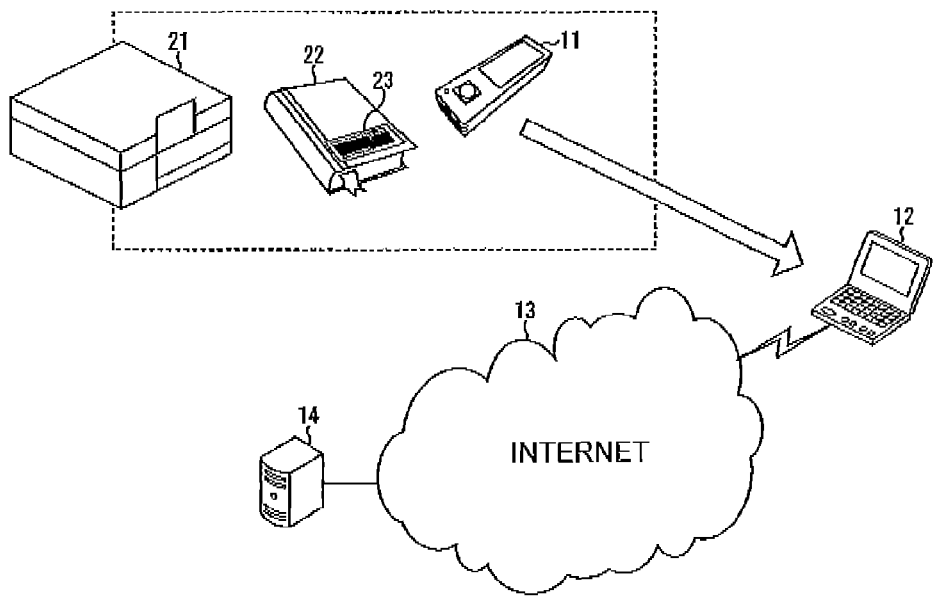
FIG. 1 is a diagram showing a configuration of an electronic commerce system including a server according to a first embodiment.

FIG. 1 is a diagram showing a configuration of an electronic commerce system including a server according to a first embodiment. The electronic commerce system is composed of a barcode reader 11, a user terminal 12, and a server 14 that is connected with the user terminal 12 through Internet 13.

The barcode reader 11 reads a barcode attached to a product or a barcode attached to a product tag or package. The barcode reader 11 is carried by a user of the user terminal 12. The barcode reader 11 is preferably configured in a form of a cell phone strap, for example.

In the case where a user of the user terminal 12 visits a real store 21 with the barcode reader 11, when the user sees an actual product 22 in the store 21 and desires to purchase the product through electronic commerce, the user makes the barcode reader 11 read a barcode 23 attached to the product 22. Then, the barcode reader 11 reads and decodes the barcode 23 and obtains a product code that identifies the product 22. The barcode reader 11 stores the product code that identifies the product 22.

The barcode 23 is JAN (Japanese Article Number) code, for example, and, when the product 22 is a book, it is ISBN (International Standard Book Number) or the like. Note that, although the barcode 23 being JAN code indicates the country code, maker code, product code and the like, and the barcode 23 being ISBN indicates the group identifier, publisher code, book title number and the like, the country code, maker code, product code, group identifier, publisher code, book title number and the like are hereinafter referred to collectively as the product code. The product code is an example of identifying information that identifies a product. Further, the barcode 23 may be a two-dimensional barcode, for example.

The user who has returned home from the store 21 connects the barcode reader 11 to the user terminal 12 though a serial bus conforming to USB (Universal Serial Bus). When the barcode reader 11 is connected, the user terminal 12 acquires the product code from the barcode reader 11 that stores the product code for identifying the product 22 and transmits the acquired product code to the server 14 through the Internet 13.

The server 14 is administered and maintained by an agency that provides a service to present a Web page for selling products to users to a store under a commission from the store, which is a corporation or individual (natural person) that sells products. In other words, the server 14 provides a virtual store on the Internet 13, which is a Web page selling products, to a user of the user terminal 12. By commissions from a large number of stores, a virtual market that is made up of pages respectively selling a large number of products is provided to users by the server 14.

The server 14 receives an application for purchase of various products (including the product 22) from users, makes arrangements for products, and performs a payment process. Further, the server 14 stores product codes corresponding to the products. For example, product codes are pre-assigned to the respective products as a result that a manager of a virtual store operates the own terminal, for example, and the server 14 stores the product codes in association with the products in a product database.

When a product code is transmitted from the user terminal 12, the server 14 retrieves product sales information, which is information about sales of the product 22 identified by the product code, from the product database, and transmits the retrieved product sales information to the user terminal 12 through the Internet 13. The product sales information is information about sales of a specific product in a store that sells the product, and it contains information such as a product name, product manufacturer, product price, stock quantity, delivery date, shipping charge, available payment method such as credit card or bank transfer, store name, store address, store contact and guarantee.

The user terminal 12 receives the product sales information that is transmitted from the server 14 and extracts the product sales information that meets predetermined extraction conditions. Then, the user terminal 12 requests the server 14 for registration to add the extracted product sales information to a dropping cart as purchase candidate information indicating candidates for purchase by the user. Alternatively, the user terminal 12 requests the server 14 for registration to add the extracted product sales information to favorites as attractive information attracting a user's attention.

When the user determines to purchase the product 22 through electronic commerce, the user terminal 12 applies for purchase of the product 22 indicated by the purchase candidate information stored in the shopping cart to the server 14 through the Internet 13. Then, the server 14 receives the application from the user terminal 12, makes arrangements for the product 22, and performs a payment.

Note that the Internet 13 is an example of a network, and the user terminal 12 and the server 14 may be connected through a wired or wireless public network or private network, which is LAN (Local Area Network), WAN (Wide Area Network) or the like, for example, not limited to the Internet 13.

The configurations of the barcode reader 11, the barcode reader 11 and the server 14 are described hereinafter with reference to FIGS. 2 to 6.

Figure 2:
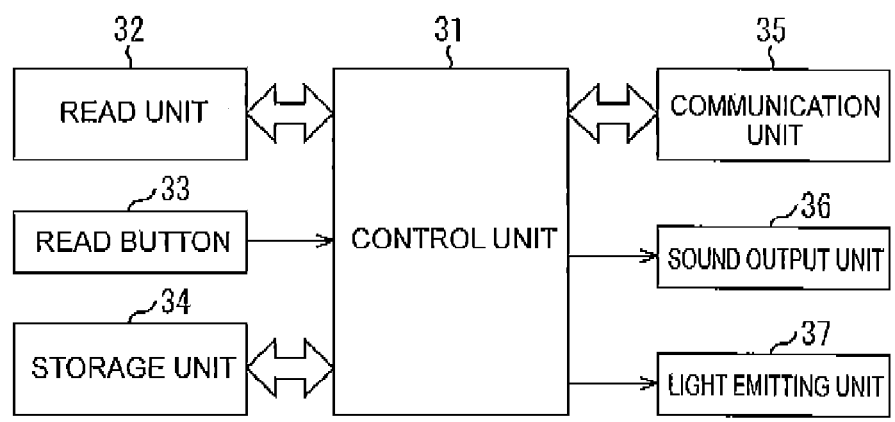
FIG. 2 is a block diagram showing a configuration example of a barcode reader shown in FIG. 1.

FIG. 2 is a block diagram showing a configuration example of the barcode reader 11. The barcode reader 11 includes a control unit 31, a read unit 32, a read button 33, a storage unit 34, a communication unit 35, a sound output unit 36, and a light emitting unit 37.

The control unit 31 is a so-called embedded MPU (Micro Processing Unit), a dedicated IC (Integrated Circuit) or the like, and controls the read unit 32, the storage unit 34, the communication unit 35, the sound output unit 36 and the light emitting unit 37 in response to operation onto the read button 33 according to a built-in program, for example. The read unit 32 includes a light-emitting device such as an infrared LED (Light Emitting Diode) or laser diode, a light-receiving device such as a photo transistor, CCD image sensor (Charge Coupled Device Image Sensor), or CMOS (Complementary Metal Oxide Semiconductor) image sensor and the like, and it applies light to the barcode 23, reads the barcode 23, and supplies a signal corresponding to the image pattern of the barcode 23 to the control unit 31.

The read button 33 is a switch, a pressure-sensitive sensor or the like, and supplies a signal indicating that it is pressed by a user to the control unit 31. When the read button 33 is pressed, the control unit 31 instructs the read unit 32 to read the barcode 23. The control unit 31 decodes the signal corresponding to the image pattern of the barcode 23 that is supplied from the read unit 32 and thereby acquires the product code that identifies the product 22. The control unit 31 stores the product code into the storage unit 34.

The storage unit 34 is nonvolatile memory such as such as EEPROM (Erasable Programmable Read Only Memory) like flash memory or MRAM (Magnetoresistive Random Access Memory), and stores the product code written by the control unit 31.

The communication unit 35 is a serial bus interface conforming to USB (which is hereinafter referred to as USB interface) or the like. The sound output unit 36 is a sound output device such as a speaker or beeper, and outputs a sound indicating success or failure of reading of the barcode 23 on the basis of control by the control unit 31. The light emitting unit 37 is a light emitting device such as LED or organic EL (Electroluminescence) device, and emits light with a color or luminescent pattern indicating success or failure of reading of the barcode 23 on the basis of control by the control unit 31.

Figure 3:
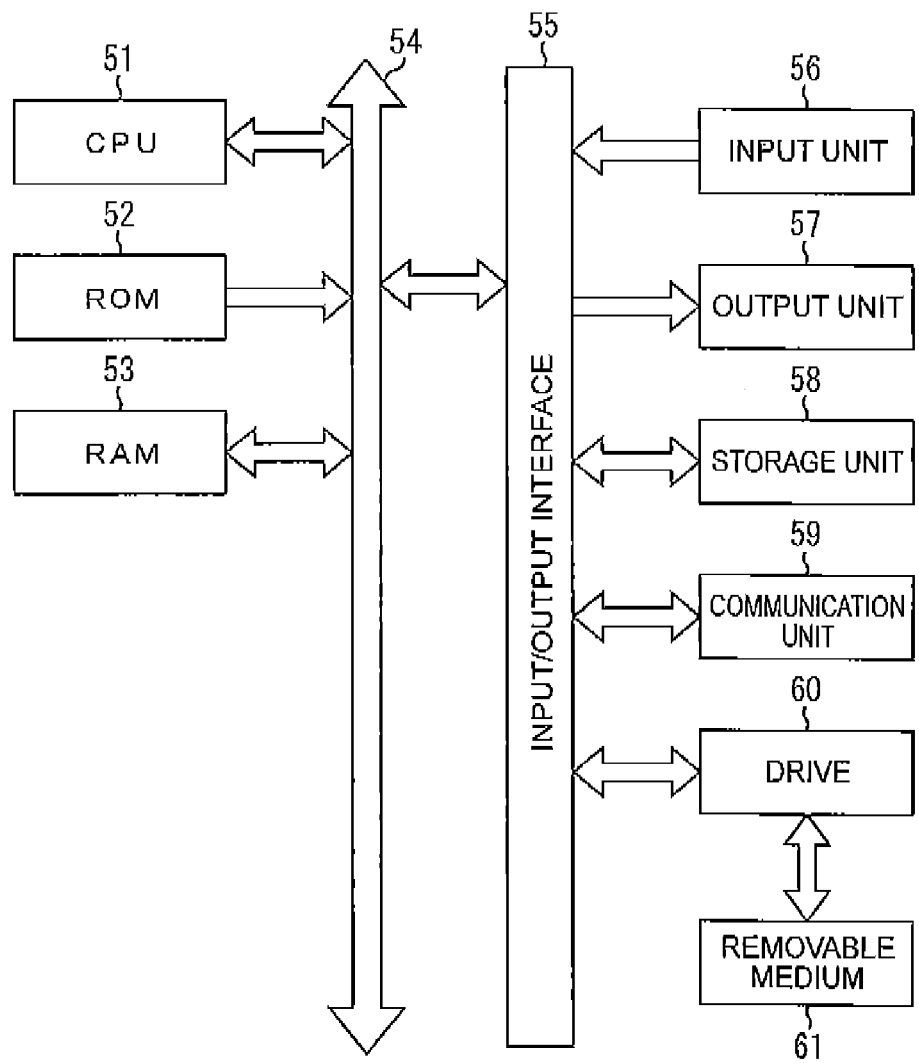
FIG. 3 is a block diagram showing a hardware configuration example of a user terminal shown in FIG. 1.

FIG. 3 is a block diagram showing a hardware configuration example of the user terminal 12.

In the user terminal 12, a CPU (Central Processing Unit) 51, ROM (Read Only Memory) 52 and RAM (Random Access Memory) 53 are connected to one another through a bus 54.

An input/output interface 55 is further connected to the bus 54. To the input/output interface 55, an input unit 56 such as a keyboard, mouse or microphone, an output unit 57 such as a display or speaker, a storage unit 58 such as a hard disk or nonvolatile memory, a communication unit 59 such as a USB interface or network interface, and a drive 60 that drives a removable medium 61 such as a magnetic disk, optical disk, magneto-optical disk or semiconductor memory are connected.

Figure 4:
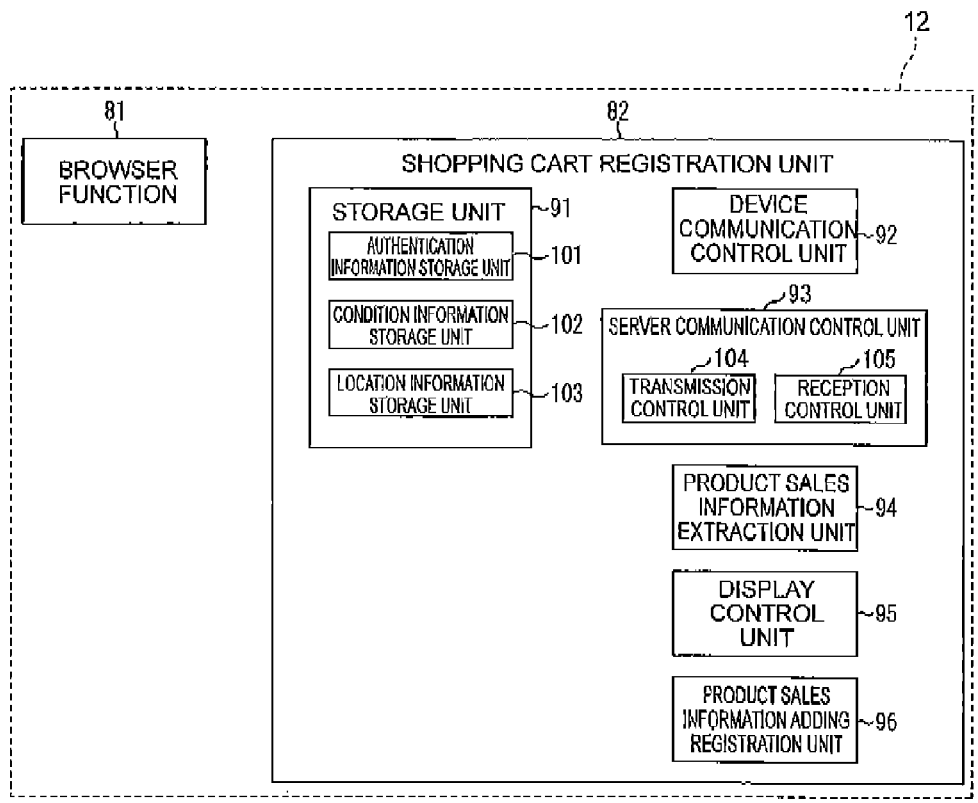
FIG. 4 is a block diagram showing a functional configuration of the user terminal shown in FIG. 1.

FIG. 4 is a block diagram showing a configuration of functions implemented in the user terminal 12 that runs a program. Specifically, when the user terminal 12 runs a program, a browser function 81 and a shopping cart registration unit 82 are implemented.

The browser function 81 is implemented by executing a so-called Web browser program such as Internet Explorer (trademark) available from Microsoft, and it acquires data of Web pages in HTML (Hypertext Markup Language), XML (Extensible Markup Language) or the like that contains various kinds of objects such as text or images on the basis of the procedure specified by HTTP (Hypertext Transfer Protocol) and presents the Web pages.

The shopping cart registration unit 82 is implemented by executing a shopping cart registration application program, and, when the barcode reader 11 storing the product code that identifies the product 22 is connected to the user terminal 12, acquires the product code from the barcode reader 11 and transmits the acquired product code to the server 14 through the Internet 13. In other words, the shopping cart registration unit 82 has a function of acquiring identifying information. Further, the shopping cart registration unit 82 receives one or a plurality of product sales information transmitted from the server 14 and extracts the product sales information that meets predetermined extraction conditions. Furthermore, the shopping cart registration unit 82 makes a request for registration to the server 14 so as to add the extracted product sales information to a shopping cart as purchase candidate information indicating candidates for purchase by a user, or makes a request for registration to the server 14 so as to add the extracted product sales information to favorites as attractive information attracting a user's attention.

The shopping cart registration unit 82 is configured to include a storage unit 91, a device communication control unit 92, a server communication control unit 93, a product sales information extraction unit 94, a display control unit 95, and a product sales information adding registration unit 96.

The storage unit 91 is placed in a given memory area of the storage unit 58, for example, and stores user IDs (Identification) and passwords for authenticating users, information indicating various conditions, information indicating whether to add product sales information to a shopping cart or to favorites and the like. The storage unit 91 is configured to include an authentication information storage unit 101, a condition information storage unit 102, and a location information storage unit 103.

The authentication information storage unit 101 stores user IDs and passwords for authenticating users. The product sales information extraction unit 94 stores information indicating sort conditions for sorting product sales information and extraction conditions for extracting product sales information. The location information storage unit 103 stores storage location designation information indicating whether to add product sales information to a shopping cart or add product sales information to favorites.

The device communication control unit 92 controls the USB interface included in the communication unit 59 and thereby controls connection to the barcode reader 11 and communication with the connected barcode reader 11.

The server communication control unit 93 controls the network interface included in the communication unit 59 and thereby controls communication with the server 14 through the Internet 13. The server communication control unit 93 is configured to include a transmission control unit 104 and a reception control unit 105. The transmission control unit 104 controls the network interface included in the communication unit 59 and thereby controls transmission of various data or information to the server 14 through the Internet 13. For example, when the barcode reader 11 that stores the read product code which identifies the product is connected to the user terminal 12, the transmission control unit 104 controls transmission of the product code acquired from the barcode reader 11 to the server 14.

The reception control unit 105 controls the network interface included in the communication unit 59 and thereby controls reception of various data or information transmitted from the server 14 through the Internet 13. For example, the reception control unit 105 controls reception of one or a plurality of product sales information transmitted from the server 14 that has retrieved the product sales information related to sales of the product 22 identified by the product code.

The product sales information extraction unit 94 extracts the product sales information that meets the extraction conditions indicated by the information stored in the condition information storage unit 102 among the product sales information received from the server 14. The display control unit 95 controls the output unit 57, which is a display, and displays the received product sales information as candidate product information or display the extracted product sales information on the output unit 57 being a display. The candidate product information is the product sales information that has been retrieved by the server based on the product code, and it is different information from purchase candidate information, which is described later. The product sales information adding registration unit 96 requests the server 14 to add the product sales information to a shopping cart or add the product sales information to favorites according to the storage location designation information stored in the location information storage unit 103. Specifically, the product sales information adding registration unit 96 adds the product sales information to a shopping cart or adds the product sales information into favorites so that the product sales information is stored in the server 14 (so that the server 14 stores the product sales information).

Figure 5:
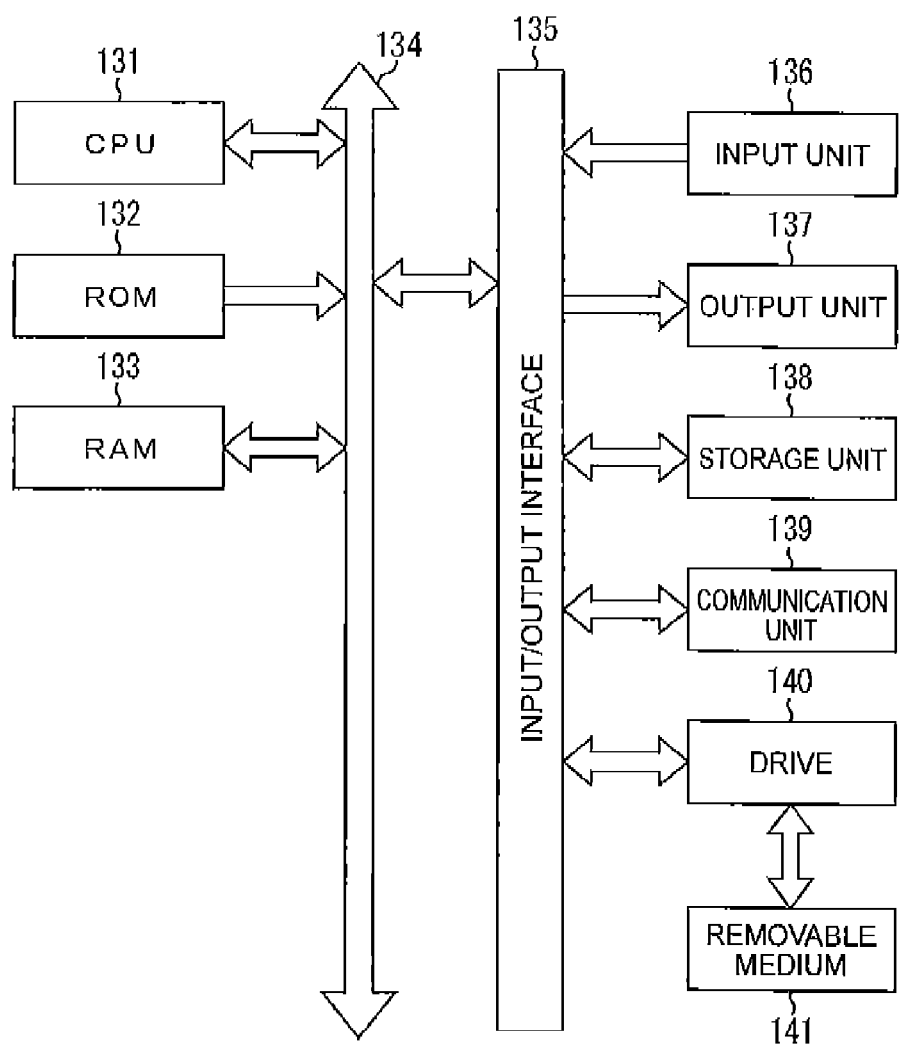
FIG. 5 is a block diagram showing a hardware configuration example of a server shown in FIG. 1.

FIG. 5 is a block diagram showing a hardware configuration example of the server 14.

In the server 14, the CPU 131, the ROM 132 and the RAM 133 are connected to one another through the bus 134.

An input/output interface 135 is further connected to the bus 134. To the input/output interface 135, an input unit 136 such as a keyboard, mouse or microphone, an output unit 137 such as a display or speaker, a storage unit 138 such as a hard disk or nonvolatile memory, a communication unit 139 such as a network interface, and a drive 140 that drives a removable medium 141 such as a magnetic disk, optical disk, magneto-optical disk or semiconductor memory are connected.

Figure 6:
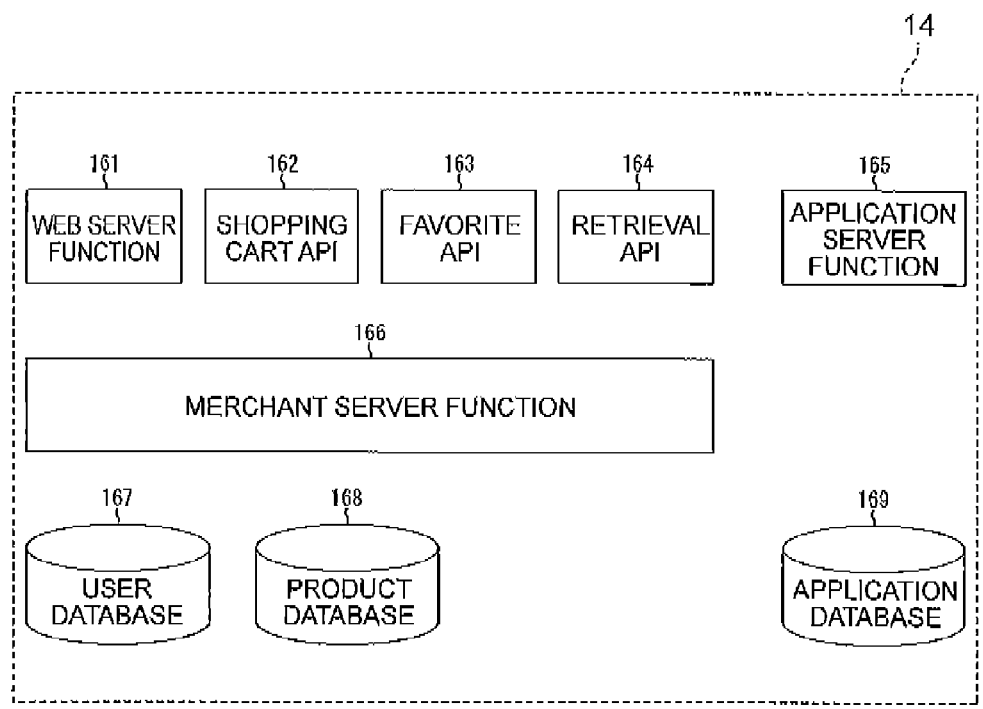
FIG. 6 is a block diagram showing a functional configuration of the server shown in FIG. 1.

FIG. 6 is a block diagram showing a configuration of functions implemented in the server 14 that runs a program. Specifically, when the server 14 runs a program, a Web server function 161, a shopping cart API (Application Program Interface) 162, a favorite API 163, a retrieval API 164, an application server function 165, a merchant server function 166, a user database 167, a product database 168, and an application database 169 are implemented.

Note that each of the user database 167, the product database 168 and the application database 169 may be built directly on a file system provided by an operating system or built using a database management system.

The Web server function 161 is implemented by executing a so-called Web server program such as Apache HTTP Server, for example, and provides data of Web pages in HTML (Hypertext Markup Language), XML (Extensible Markup Language) or the like that contains various kinds of objects such as text or images on the basis of the procedure specified by HTTP (Hypertext Transfer Protocol).

The shopping cart API 162 is implemented by a set of functions and instructions related to a so-called shopping cart that stores purchase candidate information indicating candidates for purchase by a user in response to a request from the user terminal 12, and it adds the purchase candidate information to the shopping cart or read the purchase candidate information stored in the shopping cart.

The purchase candidate information is the product sales information that is instructed to be added to a shopping cart by a user, information about the quantity of products desired to be purchased and the like. Note that the product quantity information is not included in the purchase candidate information in some cases.

The favorite API 163 is implemented by a set of functions and instructions related to so-called favorites that store attractive information attracting a user's attention in response to a request from the user terminal 12, and it adds the attractive information to the favorites or read the attractive information stored in the favorites.

The attractive information is the product sales information that is instructed to be added to favorites by a user and the like.

The retrieval API 164 is implemented by a set of functions and instructions for retrieval, and retrieves specified product sales information from Web pages provided by the server 14.

The application server function 165 provides a shopping cart registration application program for implementing the shopping cart registration unit 82 to the user terminal 12 through the Internet 13 in response to a request from the user terminal 12.

The merchant server function 166 accepts purchase of a product, makes arrangements for the product, and performs a payment process in a virtual store on the Internet 13, in response to a request from the user terminal 12.

The user database 167 stores user information, which is information about each of the registered users. For example, the user database 167 stores names, user IDs, passwords, email addresses, product purchase history, purchase candidate information, attractive information and other user information. The product database 168 stores product codes, product IDs uniquely identifying products, descriptions of products, and other product information and product sales information. The application database 169 stores the shopping cart registration application program.

Operations of the barcode reader 11, the user terminal 12 and the server 14 are described hereinafter with reference to FIGS. 7 to 10.

Figure 7:
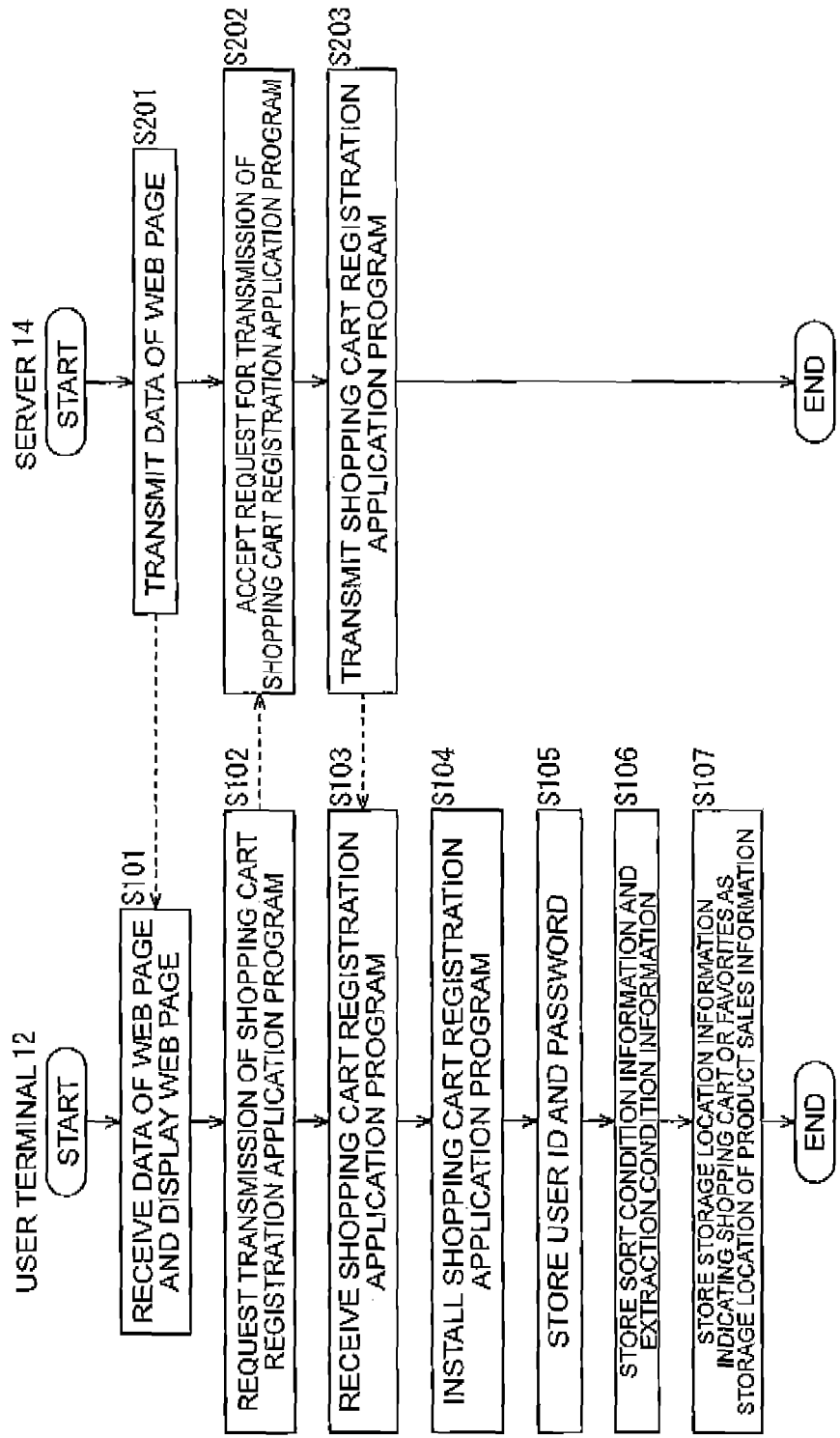
FIG. 7 is a flowchart showing a process of installing a shopping cart registration application program.

FIG. 7 is a flowchart showing a process of installing the shopping cart registration application program. As a response to a request from the user terminal 12, in Step S201, the Web server function 161 of the server 14 transmits data of a Web page to the user terminal 12 through the Internet 13. In Step S101, the browser function 81 of the user terminal 12 causes the communication unit 59, which is a network interface, to receive the data of a Web page transmitted from the server 14 and displays the Web page on the output unit 57, which is a display.

In Step S102, the browser function 81 of the user terminal 12 makes a request for transmission of the shopping cart registration application program to the server 14 through the Internet 13. Specifically, the browser function 81 causes the communication unit 59, which is a network interface, to transmit a request for the shopping cart registration application program to the server 14.

In Step S202, the Web server function 161 of the server 14 receives the request for transmission of the shopping cart registration application program from the user terminal 12. The Web server function 161 then notifies the request for transmission of the shopping cart registration application program from the user terminal 12 to the application server function 165. In Step S203, the application server function 165 reads the shopping cart registration application program from the application, database 169 and supplies it to the Web server function 161, and the Web server function 161 transmits the shopping cart registration application program to the user terminal 12 through the Internet 13.

In Step S103, the browser function 81 of the user terminal 12 causes the communication unit 59, which is a network interface, to receive the shopping cart registration application program transmitted from the server 14. In Step S104, the browser function 81 runs (starts) the received shopping cart registration application program to thereby install the shopping cart registration application program into the user terminal 12.

In Step S105, the shopping cart registration unit 82 that is implemented by running the installed shopping cart registration application program displays a field for inputting a user ID and password to login as a registered user in the server 14 on the output unit 57, which is a display, and, when a user enters the user ID and password by operating the user terminal 12, stores the input user ID and password into the authentication information storage unit 101 of the storage unit 91.

In Step S106, the shopping cart registration unit 82 displays a field for inputting sort conditions indicating conditions for sorting the product sales information and extraction conditions for extracting the product sales information on the output unit 57, which is a display, and, when a user selects the conditions or enters the sort conditions and the extraction conditions in this field by operating the user terminal 12, stores sort condition information indicating the selected or input sort conditions and extraction condition information indicating the extraction conditions into the condition information storage unit 102 of the storage unit 91.

The sort conditions may be arbitrary conditions such as low price, fast shipping, large stock, popular store, or store address close to user address.

Further, the extraction conditions may be arbitrary conditions such as lowest price, fastest shipping, largest stock, most popular store, store address closest to user address, specific store designated by a user, store winning a specified award, or store recommended by an administrator of the server 14.

In Step S107, the shopping cart registration unit 82 displays a button for inputting an instruction whether to add the product sales information to a shopping cart or favorites on the output unit 57, which is a display, and when a user clicks the button by operating the user terminal 12, stores storage location information indicating either one or both of a shopping cart and favorites as a storage location of the product sales information into the location information storage unit 103 of the storage unit 91, and the process of installing the shopping cart registration application program thereby ends. Accordingly, the storage location information indicating whether to store the product sales information as the purchase candidate information or the attractive information in the server 14 is stored in the location information storage unit 103.

Next, a process of reading a barcode that is executed when, in the store 21, the read unit 32 of the barcode reader 11 is placed over the barcode 23 attached to the product 22 and then the read button 33 is pressed by a user is described hereinafter.

Figure 8:
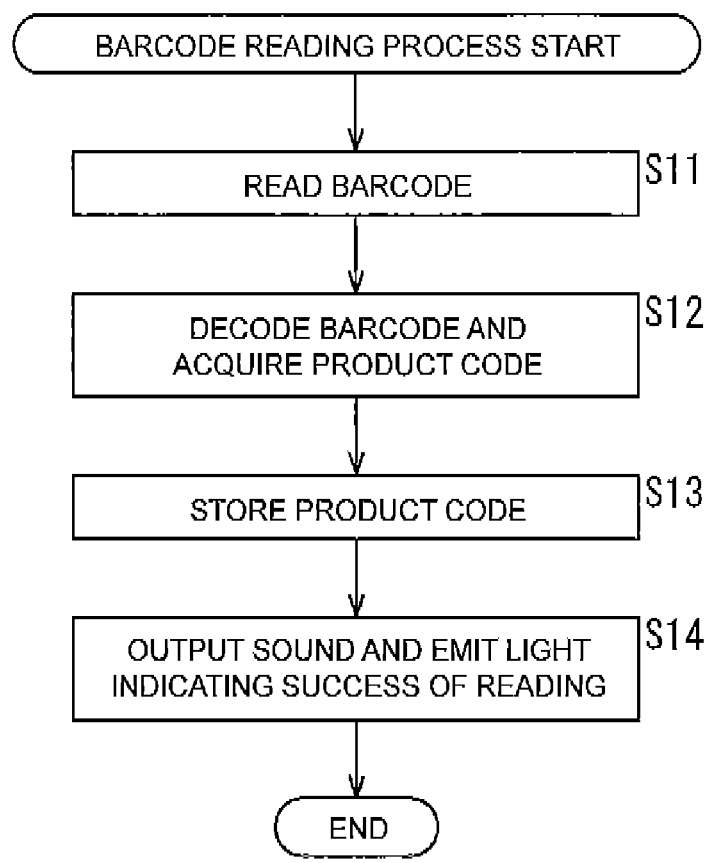
FIG. 8 is a flowchart showing a process of reading a barcode.

FIG. 8 is a flowchart showing a process of reading a barcode. In Step S11, the control unit 31 instructs the read unit 32 to read a barcode, and the read unit 32 reads the barcode 23 in response to the instruction from the control unit 31, and supplies a signal corresponding to the image pattern of the barcode 23 to the control unit 31. In Step S12, the control unit 31 decodes the barcode, that is, decodes the signal corresponding to the image pattern of the barcode 23, and thereby acquires the product code that identifies the product 22.

In Step S13, the control unit 31 stores the acquired product code into the storage unit 34. In Step S14, the control unit 31 drives the sound output unit 36 and the light emitting unit 37, causes the sound output unit 36 to output a sound indicating success of barcode reading and causes the light emitting unit 37 to emit light with a pattern indicating success of barcode reading, and the process of reading a barcode thereby ends.

Note that, when it fails to read the barcode, the control unit 31 drives the sound output unit 36 and the light emitting unit 37, causes the sound output unit 36 to output a sound indicating failure of barcode reading, which is different from the sound indicating success of barcode reading in pitch, volume or intermittent interval, and causes the light emitting unit 37 to emit light with a pattern indicating failure of barcode reading, which is different from the pattern indicating success of barcode reading in color, intensity or blinking interval.

Note that, when the above process is repeated for a plurality of products 22, the respective product codes of the plurality of products 22 are stored in the storage unit 34 of the barcode reader 11.

Next, a process of adding product sales information to a shopping cart or favorites that is executed when the terminal of the USB interface of the barcode reader 11 is inserted into the terminal of the USB interface of the user terminal 12 is described hereinafter.

Figure 9:
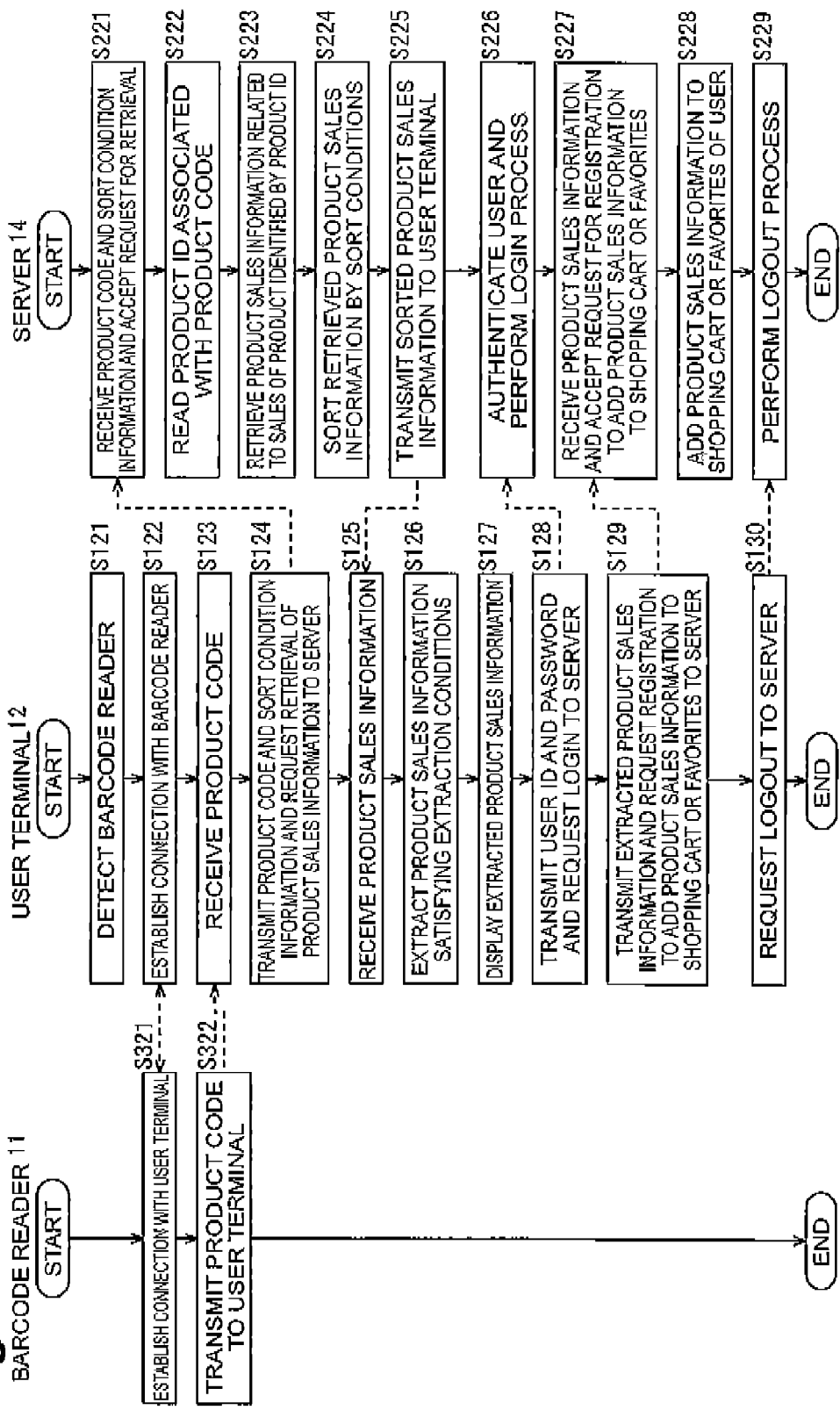
FIG. 9 is a flowchart showing a process of adding product sales information to a shopping cart or favorites in the first embodiment.

FIG. 9 is a flowchart showing a process of adding product sales information to a shopping cart or favorites. In Step S121, the device communication control unit 92 in the shopping cart registration unit 82 of the user terminal 12 detects the barcode reader 11 by a signal from the USB interface of the communication unit 59. Specifically, the device communication control unit 92 detects that the terminal of the USB interface of the barcode reader 11 is inserted into the terminal of the USB interface of the user terminal 12.

In Steps S122 and S321, the device communication control unit 92 and the USB interface of the communication unit 59, and the communication unit 35 of the barcode reader 11 establish connection with each other. In other words, in Step S122, the device communication control unit 92 and the USB interface of the communication unit 59 establish connection with the barcode reader 11, and, in Step S321, the communication unit 35 of the barcode reader 11 establishes connection with the user terminal 12.

In Step S322, the control unit 31 of the barcode reader 11 reads the stored product code from the storage unit 34, supplies it to the communication unit 35, and causes the communication unit 35 to transmit the product code to the user terminal 12. In Step S123, the device communication control unit 92 of the user terminal 12 causes the USB interface of the communication unit 59 to receive the product code transmitted from the barcode reader 11.

Note that the device communication control unit 92 of the user terminal 12 may directly access the storage unit 34 through connection between the user terminal 12 and the barcode reader 11 and read the product code from the storage unit 34.

In Step S124, the server communication control unit 93 in the shopping cart registration unit 82 of the user terminal 12 transmits the product code and the sort conditions to the server 14 through the Internet 13, and further makes a request for retrieval of the product sales information. To be more specific, the shopping cart registration unit 82 reads the sort condition information from the condition information storage unit 102 of the storage unit 91. The transmission control unit 104 of the server communication control unit 93 controls the network interface included in the communication unit 59 and causes the network interface to transmit the product code and the sort condition information and further transmit a request for retrieval of the product sales information to the server 14 through the Internet 13.

In Step S221, the retrieval API 164 of the server 14 causes the communication unit 139, which is a network interface, to receive the product code and the sort condition information and thereby accepts the request for retrieval of the product sales information. In Step S222, the retrieval API 164 reads the product ID associated with the product code from the product database 168. In Step S223, the retrieval API 164 reads one or a plurality of product sales information related to sales of the product identified by the product ID from the product database 168. Thus, the retrieval API 164 identifies the product by analyzing the received product code and then reads one or a plurality of product sales information corresponding to the product.

Note that the retrieval API 164 may directly retrieve the product sales information using the product code as a query. Further, the retrieval API 164 may retrieve the product sales information not only from the product database 168 but also from general Web pages on the Internet 13.

In Step S224, the retrieval API 164 sorts the retrieved product sales information by the sort conditions indicated by the sort condition information received in the procedure of Step S221. For example, when the sort conditions are in order of price, the retrieval API 164 sorts the retrieved product sales information in order of product price indicated by the product sales information, from lowest to highest.

In Step S225, the retrieval API 164 controls the communication unit 139 to transmit the sorted product sales information to the user terminal 12 through the Internet 13.

As described above, the retrieval API 164 functions as a first receiving means, identifying means, retrieval means, and output means.

In Step S125, the server communication control unit 93 in the shopping cart registration unit 82 of the user terminal 12 receives the sorted product sales information transmitted from the server 14 through the Internet 13. In this case, one or a plurality of product sales information are received. To be more specific, the reception control unit 105 of the server communication control unit 93 controls the network interface included in the communication unit 59 and causes the network interface to receive the sorted product sales information.

In Step S126, the product sales information extraction unit 94 reads the extraction condition information from the condition information storage unit 102 of the storage unit 91 and extracts the product sales information that meets the extraction conditions indicated by the extraction condition information among the received product sales information. For example, the product sales information extraction unit 94 extracts the product sales information with the lowest price.

In Step S127, the display control unit 95 displays the extracted product sales information on the output unit 57, which is a display.

Note that the display control unit 95 may display a list of the sorted product sales information so that the product sales information directly selected by the user is extracted. Further, the display control unit 95 may display a list of the sorted product sales information and the extracted product sales information on the output unit 57, which is a display.

In Step S128, the product sales information adding registration unit 96 transmits the user ID and password to the server 14 through the Internet 13 and further makes a request for login. Note that the user ID and password may be input by user operation on the user terminal 12. To be more specific, the product sales information adding registration unit 96 reads the user ID and password from the authentication information, storage unit 101 of the storage unit 91, controls the network interface included in the communication unit 59 and causes the network interface to transmit the user ID and password and transmit a request for login to the server 14 through the Internet 13.

In Step S226, the Web server function 161 of the server 14 receives the user ID and password and receives the request for login, and the merchant server function 166 authenticates the user by verifying the received user ID and password against the user ID and password stored in the user database 167 and then performs a login process. The user of the user terminal 12 is thereby specified.

In the server 14, when the user is authenticated and logged in, in Step S129, the product sales information adding registration unit 96 transmits the extracted product sales information to the server 14 through the Internet 13 and further makes a request for registration to add the product sales information to a shopping cart or favorites.

To be more specific, the product sales information adding registration unit 96 first reads the storage location designation information indicating whether to add the product sales information to a shopping cart or add the product sales information to favorites from the location information storage unit 103 of the storage unit 91. In the case where the storage location designation information designates addition of the product sales information to a shopping cart, the product sales information adding registration unit 96 controls the network interface included in the communication unit 59 and causes the network interface to transmit the extracted product sales information to the server 14 and further transmit a request for registration to add the extracted product sales information to a shopping cart as purchase candidate information indicating candidates for purchase by a user to the server 14, through the Internet 13.

Further, in the case where the storage location designation information designates addition of the product sales information to favorites, the product sales information adding registration unit 96 controls the network interface included in the communication unit 59 and causes the network interface to transmit the extracted product sales information to the server 14 and further transmit a request for registration to add the extracted product sales information to favorites as attractive information attracting a user's attention to the server 14, through the Internet 13.

In Step S227, the shopping cart API 162 or the favorite API 163 causes the communication unit 139 to receive the product sales information transmitted from the user terminal 12 and receives the request for registration to add the product sales information to a shopping cart or favorites. In Step S228, the shopping cart API 162 or the favorite API 163 adds the product sales information to a shopping cart or favorites according to the request from, the user terminal 12. Specifically, when registration to add the product sales information to a shopping cart is requested from the user terminal 12, the shopping cart API 162 instructs the merchant server function 166 to add the product sales information to a shopping cart, and the merchant server function 166 stores the product sales information as the purchase candidate information of the user into the user database 167.

On the other hand, when registration to add the product sales information to favorites is requested from the user terminal 12, the favorite API 163 instructs the merchant server function 166 to add the product sales information to favorites, and the merchant server function 166 stores the product sales information as the attractive information of the user into the user database 167.

Thus, the shopping cart API 162 and the favorite API 163 function as a second receiving means and a storage means, and the merchant server function 166 functions as a storage means.

In Step S130, the shopping cart registration unit 82 makes a request for logout of the user to the server 14 through the Internet 13 and, in Step S229, the merchant server function 166 performs a process to logout the user in response to the request from the user terminal 12, and the process of adding product sales information to a shopping cart or favorites thereby ends.

As described above, in the case of purchasing the product 22 seen in the actual store 21 through electronic commerce, it is possible to easily register (save) and determine candidates for purchase of the product in electronic commerce.

Note that, in the case where the respective product codes of the plurality of products 22 are stored in the barcode reader 11, the product sales information is retrieved for each of the products 22 identified by the respective product codes, and the product sales information is extracted for each of the products 22. In this case, a plurality of product sales information for the plurality of products 22 are added to a shopping cart or favorites.

Figure 10:
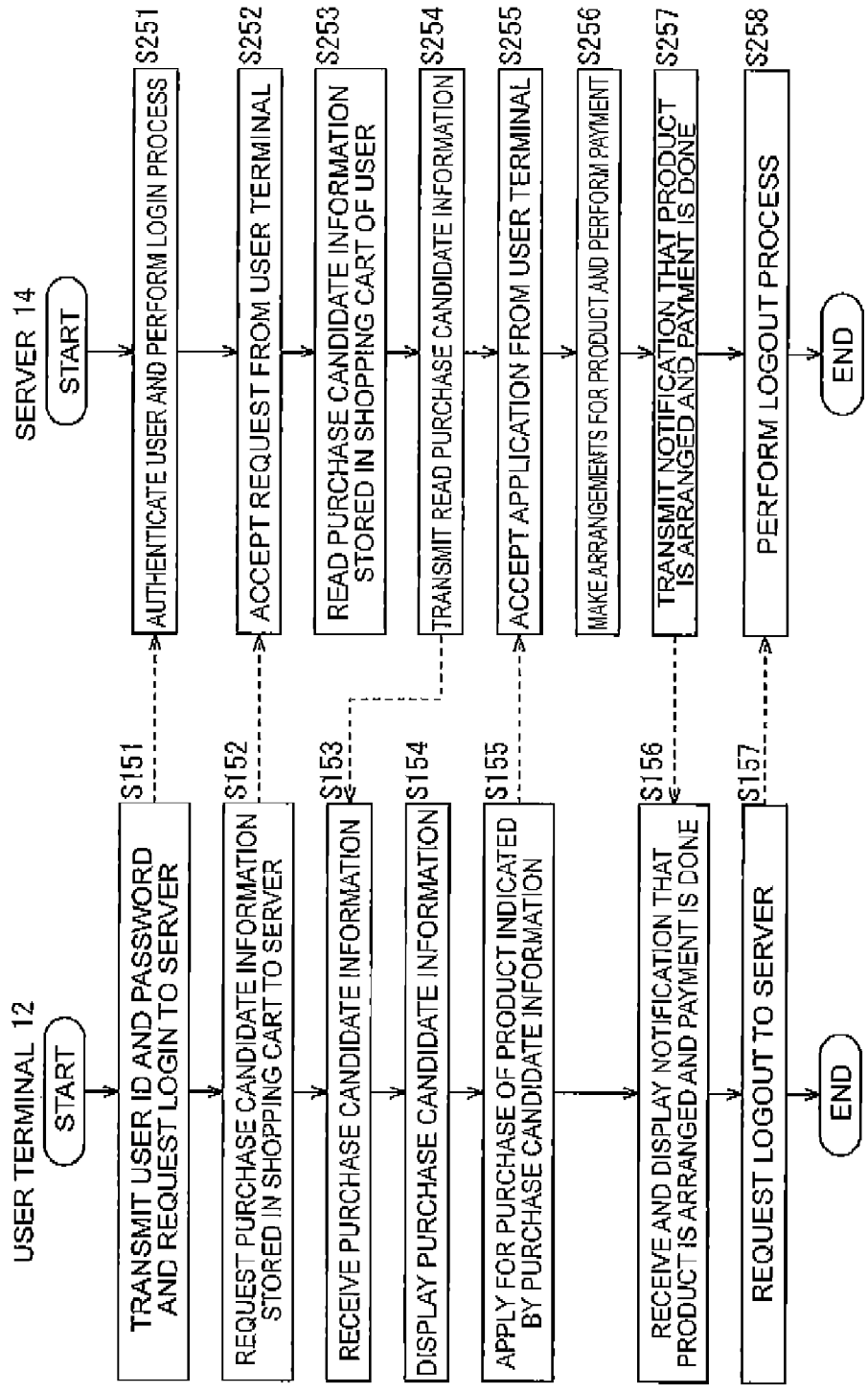
FIG. 10 is a flowchart showing a process of purchasing a product.

A process of purchasing a product is described hereinafter with reference to the flowchart of FIG. 10. In Step S151, the browser function 81 of the user terminal 12 transmits the user ID and password input by the user by operation on the user terminal 12 to the server 14 through the Internet 13 and further makes a request for login. In Step S251, the Web server function 161 of the server 14 receives the user ID and password transmitted from the user terminal 12, and the merchant server function 166 authenticates the user by verifying the user ID and password transmitted from the user terminal 12 and then performs a login process of the user.

In Step S152, the browser function 81 of the user terminal 12 makes a request for the purchase candidate information stored in a shopping cart to the server 14. In Step S252, the merchant server function 166 receives the request from the user terminal 12 and, in Step S253, the merchant server function 166 reads the purchase candidate information stored in the shopping cart of the user of the user terminal 12 from the user database 167. In Step S254, the merchant server function 166 supplies the purchase candidate information to the Web server function 161, and the Web server function 161 transmits the purchase candidate information read from the user database 167 to the user terminal 12 through the Internet 13.

In Step S153, the browser function 81 of the user terminal 12 receives the purchase candidate information transmitted from the server 14. In Step S154, the browser function 81 displays the purchase candidate information on the output unit 57, which is a display.

When a request for purchase of the product indicated by the purchase candidate information is made from a user who has viewed the displayed purchase candidate information through operation on the user terminal 12, in Step S155, the browser function 81 of the user terminal 12 makes an application for purchase of the product indicated by the purchase candidate information to the server 14 through the Internet 13. In Step S255, the merchant server function 166 of the server 14 receives the application from the user terminal 12. In Step S256, the merchant server function 166 makes arrangements for the product indicated by the purchase candidate information and performs a payment.

In Step S257, the merchant server function 166 of the server 14 transmits a notification that the product is arranged and the payment is done to the user terminal 12 through the Internet 13. In Step S156, the browser function 81 of the user terminal 12 receives and displays the notification that the product is arranged and the payment is done.

In Step S157, the browser function 81 makes a request for logout of the user to the server 14 through the Internet 13, and, in Step S258, the merchant server function 166 performs a process to logout the user in response to the request from the user terminal 12, and the process of purchasing a product thereby ends.

As described above, it is possible to purchase the product 22 which a user likes after seeing the actual product in the store 21 easily and promptly through electronic commerce with no need for burdensome operations. If the product sales information with the lowest price is extracted in advance, it is possible to purchase the product easily, promptly and at a lower price through electronic commerce. Further, if the product sales information of a predetermined store is extracted, it is possible to purchase the product from the store easily and promptly through electronic commerce.

As described in the foregoing, in the case of requesting an information provision device to store product sales information related to sales of a product retrieved using identifying information that identifies a product as purchase candidate information indicating candidates for purchase by a user, it is possible to easily determine candidates for purchase of the product in electronic commerce. Further, in the case of, when a reading device that stores read identifying information which identifies a product is connected, transmitting the identifying information acquired from the reading device to the information provision device, receiving one or a plurality of product sales information transmitted from the information provision device that has retrieved the product sales information related to sales of the product identified by the identifying information, extracting product sales information that meets predetermined extraction conditions among the received product sales information, and registering the extracted product sales information onto the information provision device so as to store the information as purchase candidate information indicating candidates for purchase by a user or attractive information attracting a user's attention, it is possible to save and determine candidates for purchase of a product in electronic commerce more easily when purchasing the product seen in the actual store through electronic commerce.

It should be noted that, although the barcode reader 11 reads a barcode in the above description, it may read a two-dimensional barcode and obtain the product code. Further, a reader to read a contact or contactless ID tag such as RFID (Radio Frequency IDentification) may be used, not limited to the barcode reader 11.

Further, although the barcode reader 11 and the user terminal 12 are connected by a USB interface in the above description, wired communication in another form, wireless communication such as communication conforming to Bluetooth may be adopted instead.

Furthermore, the user terminal 12 into which the shopping cart registration application program is preinstalled may be provided to a user.

In addition, the above-described processes may be executed by hardware or software. In the case of executing the processes by software, a program constituting the software may be installed to a computer embedded in dedicated hardware, a general-purpose personal computer, for example, capable of executing various functions when various programs are installed and the like from a program recording medium.

For example, in the user terminal 12, which is a computer, shown in FIG. 3, the CPU 51 loads a program stored in the storage unit 58, for example, to the RAM 53 through the input/output interface 55 and the bus 54 and runs the program, so that the above-described processes are performed.

The program that is run by the computer (CPU 51) is provided by being recorded in the removable medium 61 being a package medium such as a magnetic disk (including flexible disk), optical disk (CD-ROM (Compact Disc-Read Only Memory), DVD (Digital Versatile Disc) etc.), magneto-optical disk or semiconductor memory, or through a wired or wireless transmission medium such as a local area network, Internet or digital satellite broadcasting.

The program may be installed to a computer by, with the removable medium 61 attached to the drive 60, being stored into the storage medium 58 through the input/output interface 55. Further, the program may be installed to a computer by being received by the communication unit 59 though a wired or wireless transmission medium and stored into the storage medium 58. Besides, the program may be pre-installed to a computer by being prestored into the ROM 52 or the storage unit 58.

The same applies to the server 14, which is a computer, shown in FIG. 5.

It should be noted that the program run by a computer may be a program that is processed in a time sequence according to the order shown in this specification or a program that is processed in parallel or at a necessary timing such as when called.

(Second Embodiment)

An electronic commerce system that includes a server according to a second embodiment is described hereinafter with reference to FIGS. 11 to 14. The second embodiment is different from the first embodiment in the method of acquiring identifying information in the user terminal and the method of retrieving product sales information in the server on the basis of the identifying information. Hereinafter, only the differences from the first embodiment are described, and the same part as the embodiment is not redundantly described.

Figure 11:
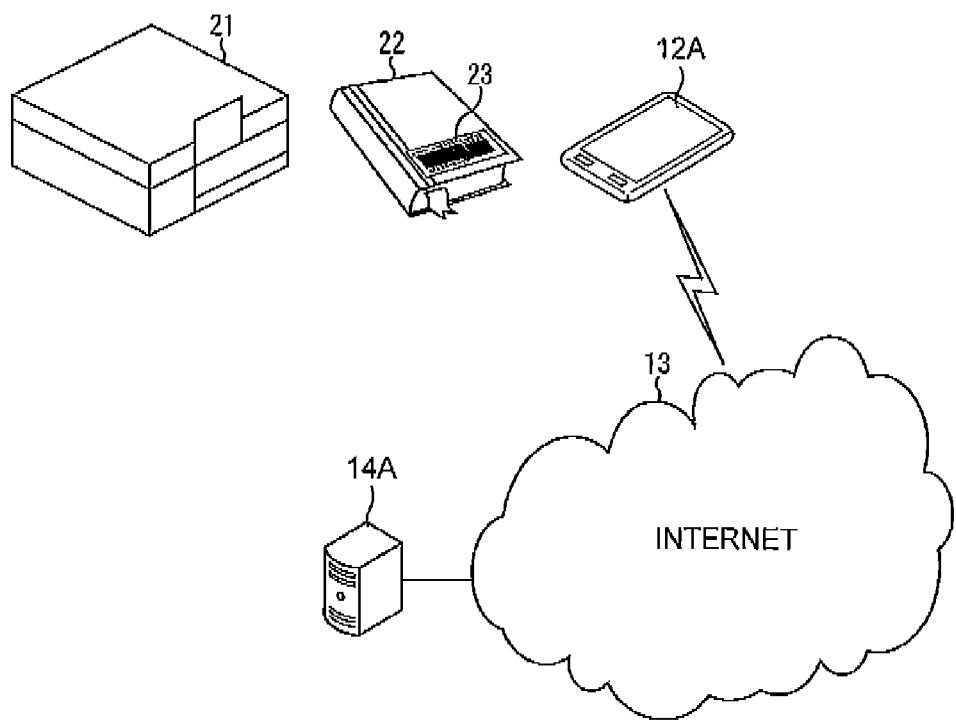
FIG. 11 is a diagram showing a configuration of an electronic commerce system including a server according to a second embodiment.

As shown in FIG. 11, the electronic commerce system according to this embodiment is composed of a user terminal 12A and a server 14A that is connected with the user terminal 12A through Internet 13.

Examples of the user terminal 12A include mobile terminals such as a sophisticated mobile phone (smartphone) and personal digital assistant (PDA), a portable personal computer and like, though the user terminal 12A is not limited thereto. Although the user terminal 12A is assumed to be a mobile terminal in this embodiment, the user terminal 12A may be a stationary terminal, not a mobile terminal.

Figure 12:
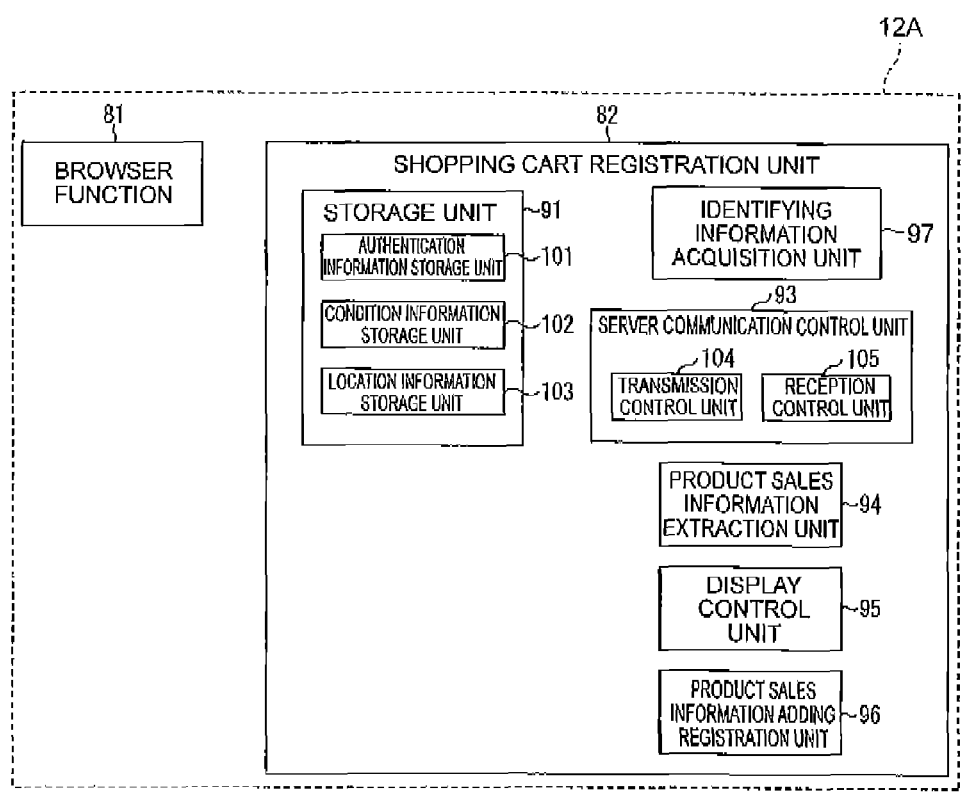
FIG. 12 is a block diagram showing a functional configuration of a user terminal shown in FIG. 11.

The user terminal 12A is different from the user terminal 12 in the first embodiment in that it directly acquires the identifying information in its own terminal rather than receiving the identifying information from another device such as the barcode reader 11. Thus, as a hardware element of the user terminal 12A, an element for acquiring the identifying information, such as a camera or barcode reader, can be included in addition to those shown in FIG. 3. On the other hand, the driver 60 may be not necessarily included. In terms of functional elements, the user terminal 12A includes an identifying information acquisition unit 97 in place of the device communication control unit 92 in the first embodiment as shown in FIG. 12.

The identifying information acquisition unit 97 is a means of directly acquiring the identifying information. The acquired identifying information is transmitted together with the user ID and the sort condition information read from the storage unit 91 to the server 14A by the server communication control unit 93. There are several methods of acquiring identifying information by the identifying information acquisition unit 97 and several varieties of the identifying information as follows.

The identifying information acquisition unit 97 may be a module that is originally mounted on the user terminal 12A or a module that is downloaded as application software from the server 14A.

First, the identifying information acquisition unit 97 may read a barcode in the same manner as the barcode reader 11 in the first embodiment and acquire the product code as the identifying information from the barcode. In this case, the identifying information acquisition unit 97 is configured to include a camera mounted on the user terminal 12A and a barcode acquisition module that analyzes a captured image and reads information embedded in the barcode. The format of the barcode is not particularly limited, which is the same as in the first embodiment.

Further, the identifying information acquisition unit 97 may acquire picture data of the actual product (including the actual product form and product-related information such as text information on the product) or picture data of product-related text (product-related information represented in text) in an information transmission medium such as catalogs as the identifying information. In this case, the identifying information acquisition unit 97 is configured to include a camera mounted on the user terminal 12A.

Furthermore, the identifying information acquisition unit 97 may acquire image data (segmented image data) of a product or product-related text that is segmented (captured) from a video showing a product as the identifying information. Note that the video showing a product may be television pictures, moving pictures posted on a specified Web site by a user and the like, though not limited thereto. In this case, the identifying information acquisition unit 97 is configured to include a module that executes Lazy Snapping (an example of techniques to segment an image). Lazy Snapping is a technique to segment an image into a foreground region (for example, a region of product or region of person) and a background region (another region). Using this technique, the identifying information acquisition unit 97 generates segmented image data of a product or product-related text from a paused video being displayed on the output unit 57.

Note that a place where a user takes a picture of the actual product or product-related text is not particularly limited. For example, a user may take a picture of a product or the like in real stores, or take a picture of a product advertised on a billboard or a product video displayed on an advertising display.

Figure 13:
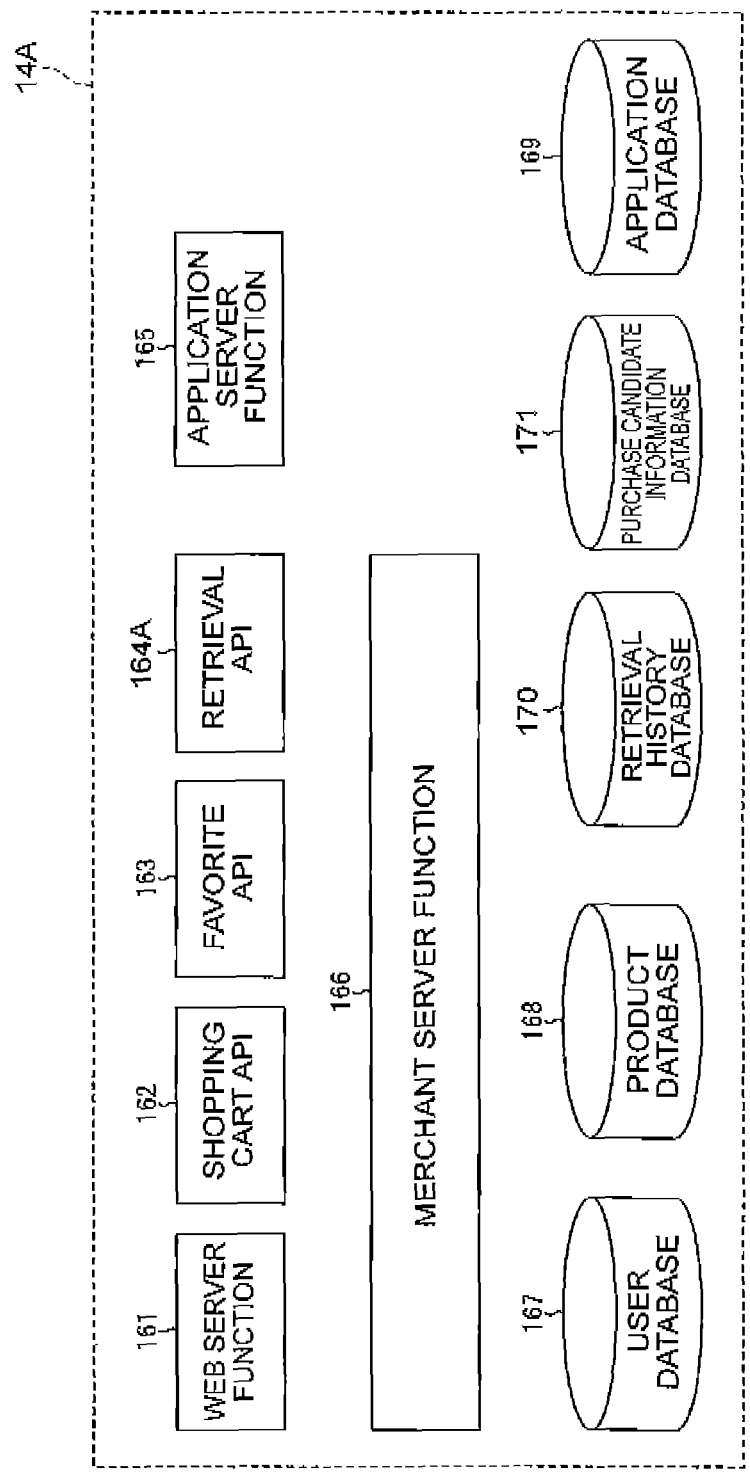
FIG. 13 is a block diagram showing a functional configuration of a server shown in FIG. 11.

The server 14A is different from the server 14 in the first embodiment in the method of retrieving and outputting product sales information on the basis of the identifying information. The hardware configuration of the server 14A is the same as that of the server 14. On the other hand, in terms of functional elements, the server 14A includes a retrieval API 164A in place of the retrieval API 164 in the first embodiment and further includes a retrieval history database 170 and a purchase candidate information database 171, as shown in FIG. 13.

Although the example in which the purchase candidate information is stored into the user database is described in the first embodiment, the purchase candidate information database 171 is placed in addition to the user database in the second embodiment. The purchase candidate information database 171 is a shopping cart to be more precise, and it is a storage unit that temporarily stores products at the stage before a final purchase is made. Further, the purchase candidate information database 171 is favorites to be more precise, and it is a storage unit that temporarily stores product purchase candidates.

The retrieval API 164A is a means of retrieving product sales information on the basis of the identifying information received from the user terminal 12A. As there are several varieties of the identifying information as described above, there are several retrieval methods by the retrieval API 164A.

When the identifying information is a product code, the retrieval API 164A retrieves the product sales information using the product code, just like the retrieval API 164 in the first embodiment. In this case, identification of a product associated with the product code and retrieval of the product sales information related to the identified product can be regarded as one retrieval process.

On the other hand, when the identifying information is determined to be picture data or segmented image data, the retrieval API 164A identifies a product indicated by the identifying information by executing a specified image recognition process of the data (by analyzing the data).

For example, when the picture data or segmented image data of the actual product form is received as the identifying information, the retrieval API 164A compares the image with the product images of the respective products stored in the product database 168 and identifies one or a plurality of products that are likely to be taken or captured in the user terminal 12A. The identification process is based on the premise that product image data is contained in the product information or product sales information stored in the product database 168.

When the picture data or segmented image data of the product-related text (text information related to a product) is received as the identifying information, the retrieval API 164A recognizes characters in the image, compares the recognized characters with the product information or product sales information (specified attribute information) in the product database 168, and identifies one or a plurality of products that are likely to be taken or captured in the user terminal 12A. The product-related text and the attribute information to be compared with the text may be product names, model numbers or the like, for example, though the attributes to be compared are not particularly limited.

Because a certain degree of noise can occur in such an image recognition process, the retrieval API 164A identifies a plurality of products as estimation results in some cases.

Then, the retrieval API 164A extracts (reads) one or a plurality of product sales information corresponding to the identified one or plurality of products from the product database 168. At this time, the retrieval API 164A may extract the product sales information for all of the identified products (automatic extraction) or extract the product sales information only for the products designated by a user among the identified products (extraction by user designation).

In the case of the automatic extraction, the retrieval API 164A extracts the product sales information for each of the identified one or plurality of products. In this manner, by retrieving the product sales information of the identified products without making inquiries to a user, it is possible to provide information about the product to the user without asking for many operations to the user.

In the case of the extraction by user designation, the retrieval API 164A generates a Web page for allowing selection of one or more products from the identified products and transmits the page to the user terminal 12A. After that, the retrieval API 164A receives operation information indicating user operation on the Web page from the user terminal 12A. The operation information is information indicating one or a plurality of products selected by a user. The retrieval API 164A then extracts the product sales information for each of the one or plurality of products indicated by the operation information. In this manner, by allowing a user to select the search targets of the product sales information, it is possible to prevent information about the product which is unwanted by a user from being provided to the user.

Further, as a method of generating information indicating one or a plurality of products selected by a user, the information may be extracted automatically according to the extraction conditions preset to the user terminal 12 by a user.

Then, the retrieval API 164A stores the product sales information extracted from the product database 168 as a retrieval history into the retrieval history database 170. Specifically, the retrieval API 164A generates history data by associating the received user ID and the current date and time (date and time recorded) with each of the product sales information and stores the history data into the retrieval history database 170. Further, the retrieval API 164A executes the sorting of the extracted product sales information in the same manner as in the first embodiment and transmits the sorted product sales information as candidate product information to the terminal 12A. The candidate product information is displayed on the user terminal 12A.

As described above, the retrieval API 164A functions as a first receiving means, identifying means, retrieval means, and output means.

The retrieval history database 170 is a means of storing the product sales information retrieved based on the identifying information as the retrieval history of a user. Specifically, the retrieval history database 170 stores history data in which a user ID, date and time recorded, product sales information, a first addition flag indicating whether addition to a shopping cart is made for the product sales information, and a second addition flag indicating whether addition to favorites is made for the product sales information are associated with one another. Among the history data, the user ID, the date and time recorded and the product sales information are recorded by the retrieval API 164A. On the other hand, the first addition flag is updated upon addition of product sales information to a shopping cart by the shopping cart API 162, and the second addition flag is updated upon addition of product sales information to favorites by the favorite API 163.

Note that the retrieval history database 170 may be built directly on a file system provided by an operating system or built using a database management system.

Figure 14:
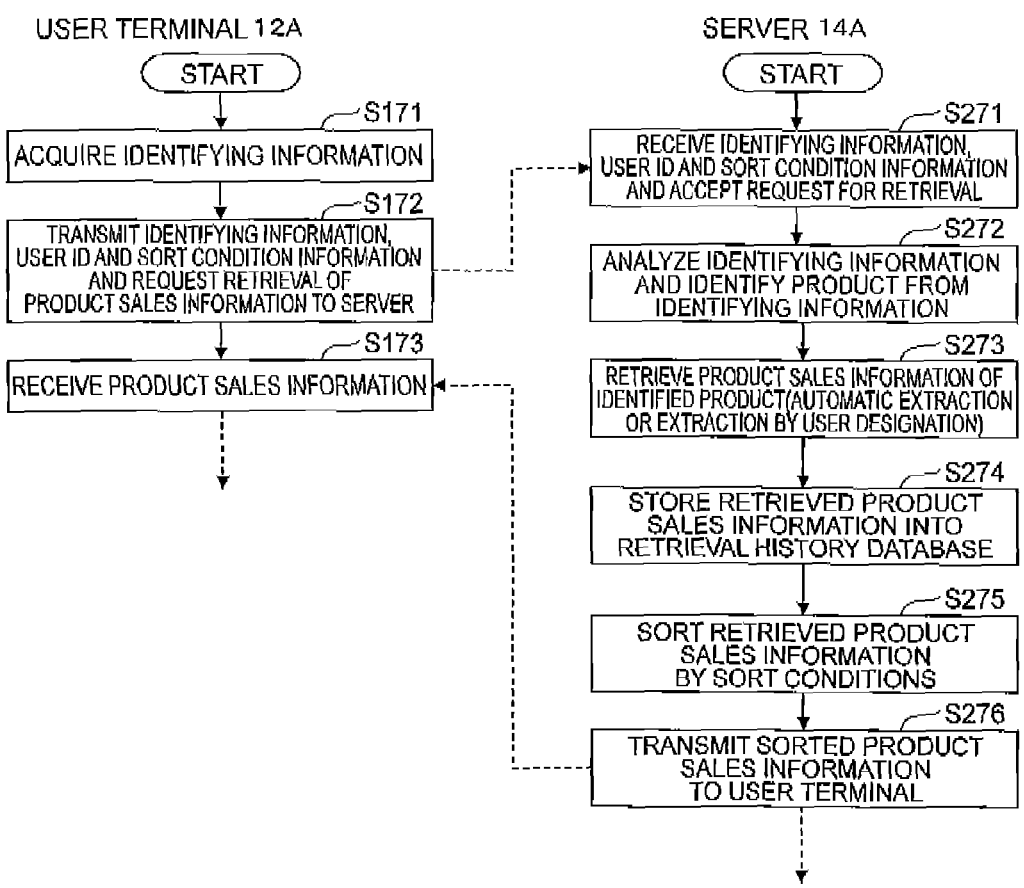
FIG. 14 is a flowchart showing a part of a process of adding product sales information to a shopping cart or favorites in the second embodiment.

A process of adding product sales information to a shopping cart or favorites in the second embodiment is described hereinafter with reference to FIG. 14.

In Step S171, the identifying information acquisition unit 97 of the user terminal 12A acquires identifying information (product code, picture data or segmented image data). Then, the server communication control unit 93 transmits the identifying information, the user ID and the sort condition information to the server 14 and further makes a request for retrieval of the product sales information.

In Step S271, the retrieval API 164A of the server 14A causes the communication unit 139 to receive the identifying information, the user ID and the sort condition information and receives the request for retrieval of the product sales information. In Step S272, the retrieval API 164A identifies one or a plurality of products by analyzing the identifying information. In Step S273, the retrieval API 164A retrieves one or a plurality of product sales information corresponding to the identified products. At this time, the retrieval API 164A reads the product sales information from the product database 168 using either one of the automatic extraction and the extraction by user designation.

In Step S274, the retrieval API 164A stores the retrieved product sales information into the retrieval history database. In Step S275, the retrieval API 164A sorts the retrieved product sales information according to the sort conditions indicated by the sort condition information received in the procedure of Step S221. In Step S276, the retrieval API 164A controls the communication unit 139 to transmit the sorted product sales information to the user terminal 12A through the Internet 13.

In Step S173, the server communication control unit 93 of the user terminal 12 receives the sorted product sales information transmitted from the server 14 through the Internet 13.

The process after Step S173 in the user terminal 12A is substantially the same as the process after Step S126 in the first embodiment. The process after Step S276 in the server 14A is substantially the same as the process after Step S226 in the first embodiment. In FIG. 14, the same part as in the first embodiment (FIG. 9) is not shown.

The product sales information retrieved based on the identifying information is stored into the retrieval history database 170. Thus, the user terminal 12A can not only receive the product sales information just after transmitting the identifying information but also reacquire the product sales information by accessing the retrieval history database 170 without transmitting the identifying information again as described above. A user can thereby not only view the product sales information related to the product photographed in an actual store while being in the store but also view the information again after returned home.

As described above, by storing retrieval results as a history in the retrieval history database 170, not just displaying them on the user terminal 12A, it is possible to access the product sales information later. It is thereby possible to provide the product sales information to a user without need for the user to retransmit the identifying information, so that the user can easily save and determine candidates for purchase of a product. Note that, in the first embodiment also, if the server 14 includes the retrieval history database 170 and the retrieval API 164 further has a function of recording the retrieval history into the database 170, the same advantages can be obtained.

Further, the product sales information retrieved in the server 14A and extracted under specified conditions in the user terminal 12A are stored into the purchase candidate information database 171 as purchase candidate information or attractive information. Thus, a user can easily save and determine candidates for purchase of a product. The same applies to the first embodiment.

Further, because a user can acquire the identifying information by barcode reading, picture taking or video capturing, the product sales information can be obtained easily. The same applies to the first embodiment.

Furthermore, because the product sales information is sorted according to the conditions designated on the user terminal 12A side and provided to the user terminal 12A, the information is provided in a more convenient form. The same applies to the first embodiment.

Embodiments of the present invention are not restricted to the above-described embodiments, and various changes and modifications may be made without departing from the scope of the invention.

REFERENCE SIGNS LIST

11 ... Barcode reader, 12, 12A ... User terminal, 13 ... Internet, 14, 14A ... Server, 51 ... CPU, 52 ... ROM, 53 ... RAM, 58 ... Storage unit, 59 ... Communication unit, 61 ... Removable medium, 81 ... Browser function, 82 ... Shopping cart registration unit, 91 ... Storage unit, 92 ... Device communication control unit, 93 ... Server communication control unit, 94 ... Product sales information extraction unit, 95 ... Display control unit, 96 ... Product sales information adding registration unit, 97 ... Identifying information acquisition unit, 101 ... Authentication information storage unit, 102 ... Condition information storage unit, 103 ... Location information storage unit, 104 ... Transmission control unit, 105 ... Reception control unit, 131 ... CPU, 132 ... ROM, 133 ... RAM, 138 ... Storage unit, 139 ... Communication unit, 141 ... Removable medium, 161 ... Web server function, 162 ... Shopping cart API, 163 ... Favorite API, 164, 164A ... Retrieval API, 165 ... Application server function, 166 ... Merchant server function, 167 ... User database, 168 ... Product database, 169 ... Application database, 170 ... Retrieval history database, 171 ... Purchase candidate information database.

The invention claimed is:

1. A user terminal, including at least one processor, connectable to a server that performs purchase processing for a product placed in a virtual shopping cart of a user, the user terminal comprising:
 at least one processor coupled to at least one memory storing a program code, the at least one first processor and operable to read the program code and operate as instructed by the program code to:
 establish a connection with a barcode reader operated by a user to read a barcode of a product;
 acquire a product code associated with the barcode of the product obtained by the barcode reader; and
 transmit the product code acquired from the barcode reader and a registration request for adding the product identified by the product code to the virtual shopping cart of the user based on a previously stored registration information,
 where the registration request for adding the product identified by the product code to the virtual shopping cart of the user is transmitted to the server without receiving an operation of the user after the product code is acquired from the barcode reader.

2. The user terminal according to claim 1, further comprising:
 a memory that stores a user ID identifying the user,
 wherein, after the product code is acquired, the at least one processor is programmed to transmit the user ID stored in the memory to the server without receiving the operation of the user so that the server performs login processing and adds the product to the virtual shopping cart of the logged-in user.

3. The user terminal according to claim 2, wherein the at least one processor is programmed to transmit a request for logging out the user to the server without receiving the operation of the user, after transmitting the registration request.

4. The user terminal according to claim 1,
 the memory further stores an extraction condition for extracting the product that is sold by one of a plurality of virtual stores selling the product identified by the product code,
 wherein the at least one processor is programmed to transmit to the server the product code and the registration request for adding the product that meets the extraction condition to the virtual shopping cart, without receiving the operation of the user.

5. A method executed by a user terminal, which includes at least one processor and is connectable to a server that performs purchase processing for a product placed in a virtual shopping cart of a user, the method comprising:

establishing a connection with a barcode reader operated by a user to read a barcode of a product;

acquiring, using the processor, a product code associated with the barcode of the product obtained by the barcode reader; and transmitting, using the processor, to the server the acquired product code and a registration request for adding the product identified by the product code to the virtual shopping cart of the user based on a previously stored registration information, without receiving an operation of the user, where the registration request for adding the product identified by the product code to the virtual shopping cart of the user is transmitted to the server without receiving an operation of the user after the product code is acquired from he barcode reader.

6. A non-transitory computer-readable recording medium having a program recorded thereon, the program causing a computer to function as a user terminal connectable to a server that performs purchase processing for a product placed in a virtual shopping cart of a user, the user terminal configured by the program to:

establish a connection with a barcode reader operated by a user to read a barcode of a product;

acquire a product code associated with the barcode of the product obtained by the barcode reader; and transmit the product code acquired from the barcode reader and a registration request for adding the product identified by the product code to the virtual shopping cart of the user based on a previously stored registration information, where the registration request for adding the product identified by the product code to the virtual shopping cart of the user is transmitted to the server without receiving an operation of the user after the product code is acquired from the barcode reader.

\* \* \* \* \*